(12) United States Patent
Park

(10) Patent No.: US 6,275,208 B1
(45) Date of Patent: Aug. 14, 2001

(54) MULTIPLE OUTPUT DC/DC VOLTAGE CONVERTER AND LIQUID CRYSTAL DISPLAY USING THEREOF

(75) Inventor: Jin-Ho Park, Kyongki-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/130,005

(22) Filed: Aug. 6, 1998

(30) Foreign Application Priority Data

Aug. 8, 1997 (KR) ................................. 97-37918

(51) Int. Cl.[7] .......................... G09G 3/36; G09G 5/00
(52) U.S. Cl. .................................. 345/94; 345/211
(58) Field of Search .................... 345/60, 68, 69, 345/70, 112, 150, 152, 30, 55, 84, 87, 89, 204, 211, 94, 98; 330/252, 254; 327/94, 96; 323/282, 285

(56) References Cited

U.S. PATENT DOCUMENTS

| | | | |
|---|---|---|---|
| 3,571,692 | * 3/1971 | Andren | 363/16 |
| 4,685,903 | * 8/1987 | Cable et al. | 604/154 |
| 5,003,244 | * 3/1991 | Davis, Jr. | 320/17 |
| 5,583,424 | * 12/1996 | Sato et al. | 323/282 |
| 5,691,657 | * 11/1997 | Hirano et al. | 327/94 |
| 5,712,692 | * 1/1998 | Kanagawa et al. | 348/790 |
| 5,818,300 | * 10/1998 | Hirano | 330/252 |
| 5,854,617 | * 12/1998 | Lee et al. | 345/102 |

* cited by examiner

*Primary Examiner*—Bipin Shalwala
*Assistant Examiner*—Jeff Piziali
(74) *Attorney, Agent, or Firm*—Myers Bigel Sibley & Sajovec

(57) ABSTRACT

The multiple output DC/DC voltage converter is needed to generate voltages used in LCD. The multiple output DC/DC voltage converter generates a main supply voltage and at least two more auxiliary supply voltages. The main supply voltage is used as the data supply voltage which requires a significant amount of the power in the LCD and the auxiliary supply voltages are used as the gate on voltage and the gate off voltage. The data supply voltage is provided to the gray voltage generator and used in generating the gray voltage. The gate on voltage and the gate off voltage are provided to the gate driver. The multiple output DC/DC voltage converter comprises a transformer having a primary coil applied with the input DC voltage and at least two more secondary coils, a switch which repeatedly turns on or off responsive to the switching signal to change the current of the primary coil, a plurality of diodes connected to the each winding of the transformer and rectifying the voltage generated in the each coil and a plurality of capacitors connected to the each diode, charging the rectified voltage and generating constant voltage.

14 Claims, 3 Drawing Sheets

# MULTIPLE OUTPUT DC/DC VOLTAGE CONVERTER AND LIQUID CRYSTAL DISPLAY USING THEREOF

BACKGROUND OF THE INVENTION (a) Field of the Invention

The present invention relates to a DC/DC voltage converter with multiple output voltages (hereinafter, it is called as multiple output DC/DC voltage converter) mainly applied to an active matrix-type liquid crystal display (LCD). More particularly, this invention relates to the multiple output DC/DC voltage converter combining a choke method with a fly-back method using a transformer and the LCD using thereof.

(b) Description of the Related Art

The DC/DC voltage converter converting DC supply voltage to a predetermined DC voltage having a different magnitude from the DC supply voltage is broadly used to a portable electronic equipment. Accordingly, this DC/DC voltage converter requires high efficiency, compactness and low price. Furthermore, since the portable electronic equipment commonly requires a plurality of DC supply voltages, the DC/DC voltage converter requires a plurality of output DC voltages.

FIG. 1 shows a pixel structure in the LCD.

As shown in FIG. 1, the pixel of the LCD comprises a pixel electrode formed in an area where a gate line crosses a data line, a common electrode facing the pixel electrode and a switch which is connected to the gate line, the data line and the pixel electrode, and is turned on/off responsive to a gate voltage applied through the gate line. The switch is made up of a thin film transistor (TFT). According to on/off state of the TFT, the switch applies or cut off a data supply voltage to the pixel electrode.

FIG. 2 shows waveforms of voltages applied to the pixel in FIG. 1.

In FIG. 2, the gate voltages have a gate on voltage Von for turning on the TFT and a gate off voltage Voff for turning off the TFT, and are applied to the gate line in FIG. 1. A common electrode voltage has a reverse phase with a data voltage. The common electrode voltage is applied to the common electrode and the data voltage is applied to the data line.

The common electrode voltage and the data voltage consume a significant amount of energy and require accurate voltages, and therefore, the common electrode voltage and the data voltage are provided from a main power supply. The gate on voltage Von and the gate off voltage Voff needs a small amount of energy, and therefore the gate on voltage Von and the gate off voltage Voff are provided from auxiliary power supplies.

In order to generate the voltages needed in driving the LCD, voltage generators using the choke method or the fly-back method are generally used.

FIG. 3 shows a voltage generator of the choke method.

As shown in FIG. 3, in the voltage generator of the choke method, a transistor Q1 periodically turns on or off responsive to a switching signal SW from switch control circuit 31. Consequently, it happens the current of an inductor L1 to change. The changing current causes a DC input voltage Vin to change into an AC(alternate current) voltage. The changed AC voltage is rectified by a diode D1 and a capacitor C1. At this time, the magnitude of a voltage charged in the capacitor C1, that is, an output voltage Vout depends on an on/off duty ratio of transistor Q1. The output voltage has a good efficiency. However, the voltage generator of the choke method produces only one output voltage. Therefore, there is a problem that the voltage generators are needed as many as DC voltages needed in an LCD for the purpose of applying to the LCD.

FIG. 4 shows a voltage generator of the fly-back method using the transformer.

As shown in FIG. 4, the voltage generator of the fly-back method has a transistor Q2 connected to a primary coil T1 of the transformer and pairs of diode-capacitors D2, C2: D3, C3: D4, C4 each connected to a plurality of secondary coils of the transformer T2, T3, T4.

In the voltage generator described in FIG. 4, the transistor Q2 periodically turns on or off responsive to a switching signal SW from a switch control circuit 41 and consequently it causes the current flowing through the primary coil T1 to change. The current change causes magnetic field to change and the change of magnetic field induces a voltage to the secondary coils T2, T3, T4 respectively. Accordingly, voltages induced in the secondary coils T2, T3, T4 are rectified to constant voltages by pairs of diode-capacitors and magnitude of the voltages charged in each capacitor C2, C3, C4 are determined by winding numbers of the primary and secondary coils. The voltages charged in the each capacitor C2, C3, C4 are used as the gate on voltage Von, the data supply voltage VDD and the gate off voltage Voff which are provided to the LCD module.

However, since the voltage generator of the fly-back method has a feature that the magnetic energy from the primary coil transfers to the secondary coil via magnetic core, there is a problem that it basically has a low efficiency and a big size of the transformer. Specifically, in case that the main power supply is generated using the voltage generator of the fly-back method, the size of the transformer becomes bigger.

SUMMARY OF THE INVENTION

An object of the invention is to minimize the related impediments described above. Another object of the invention is to the voltage generator which can obtain multiple output voltages as well as the main power supply with high efficiency, combining the choke method with the fly-back method.

The LCD in accordance with the present invention comprises a LCD panel, a gate driver, a source driver, a gray voltage generator and a multiple output DC/DC voltage converter.

The LCD panel has a plurality of the pixels arranged in a matrix type and the each pixel is formed in the area where is defined by a plurality of the gate lines and a plurality of the data lines crossing the gate lines. The gate driver is connected to the LCD panel via a plurality of the gate lines and scans the pixels of the LCD by a row. The source driver is connected to the LCD panel via a plurality of the data lines, and receives the gray voltage and a video signal to select the gray voltage corresponding to the video signal, and then applies the selected gray voltage to the LCD panel as the data supply voltage.

The multiple output DC/DC voltage converter generates a main supply voltage and at least two more auxiliary supply voltages. The main supply voltage is used as the data supply voltage which requires a significant amount of the power in the LCD and the auxiliary supply voltages are used as the gate on voltage and the gate off voltage. The data supply voltage is provided to the gray voltage generator and used in generating the gray voltage. The gate on voltage and the gate off voltage are provided to the gate driver.

The multiple output DC/DC voltage converter comprises a transformer having a primary coil applied with the input DC voltage and at least two more secondary coils, a switch which repeatedly turns on or off responsive to the switching signal to change the current of the primary coil, a plurality of diodes connected to the each winding of the transformer and rectifying the voltage generated in the each coil and a plurality of capacitors connected to the each diode, charging the rectified voltage and generating constant voltage.

In accordance with the present invention, the main supply voltage uses the constant voltage obtained from the primary coil of the transformer, the auxiliary supply voltage uses at least the two more constant voltages from the secondary coils of the transformer, and accordingly, the multiple output voltages are supplied to the LCD.

Further, the multiple output DC/DC voltage converter in accordance with the present invention generates the main supply voltage with high efficiency directly obtained from the primary coil, and, together with the auxiliary supply voltages obtained from the secondary coils. the main supply voltage with the high efficiency is supplied. That is, the DC/DC voltage converter provides the multiple output voltages and the main supply voltage with the high efficiency simultaneously.

BRIEF DESCRIPTION OF THE DRAWINGS

These and other features and advantages of the present invention may be better and more completely understood by studying the following detailed description of the presently preferred embodiments together with the appended drawings, of which.

DETAILED DESCRIPTION OF THE PREFERRED EMBODIMENTS

Figure 5:
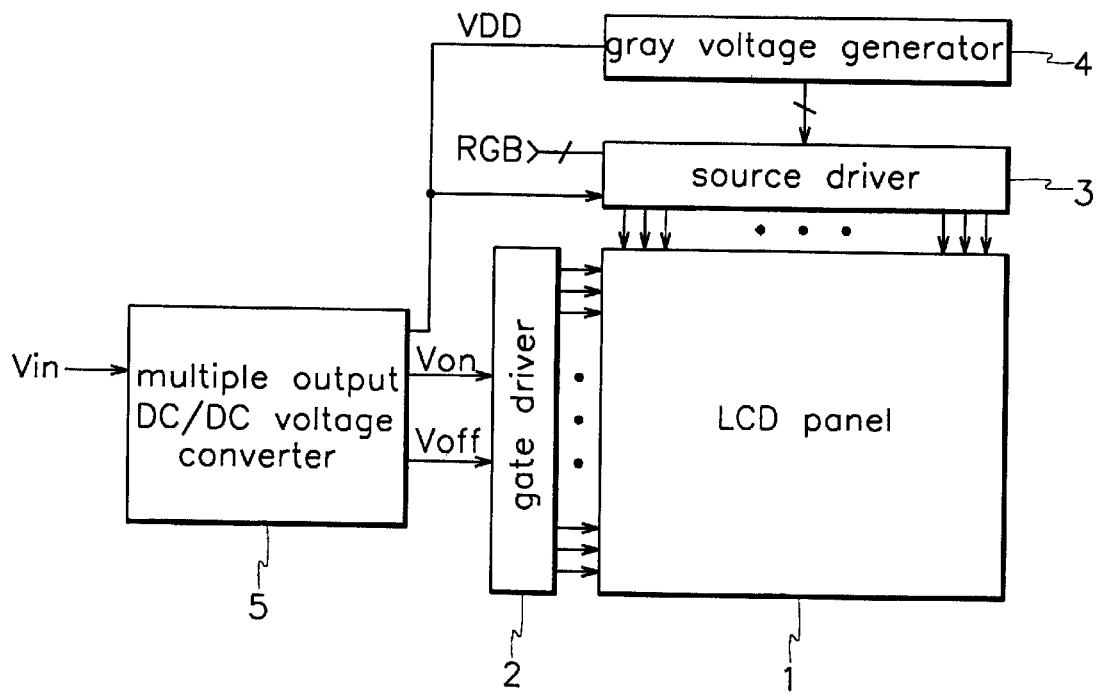
FIG. 5 is a block diagram of the LOD in accordance with a first embodiment of the present invention.

Hereinafter, the accompanying drawings, which are incorporated in and constitute a part of the specification, illustrate an embodiment of the invention, and, together with the description, serve to explain the principles of the invention:

FIG. 5 is a block diagram of the LCD in accordance with a first embodiment of the present invention.

Figure 6:
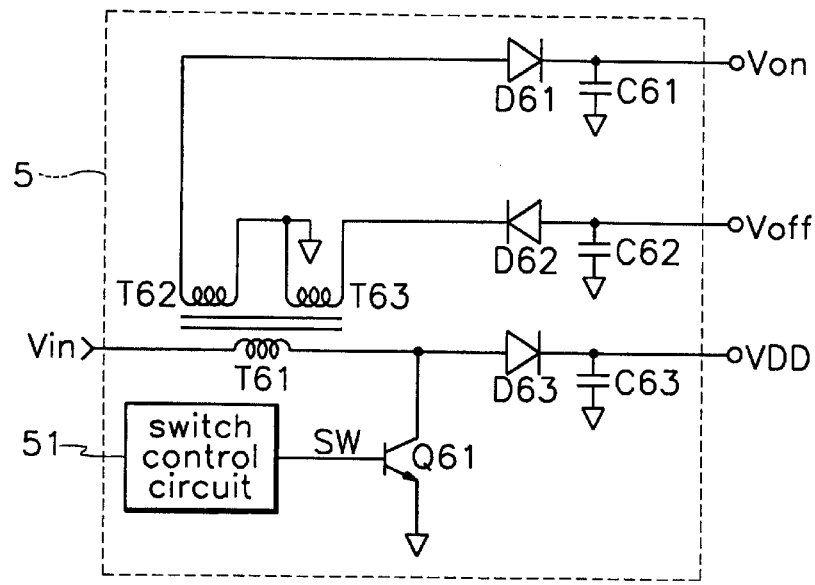
FIG. 6 is a detailed circuit diagram of a multiple output DC/DC voltage converter in FIG. 5.

FIG. 6 is a detailed circuit diagram of a multiple output DC/DC voltage converter in FIG. 5.

Figure 7:
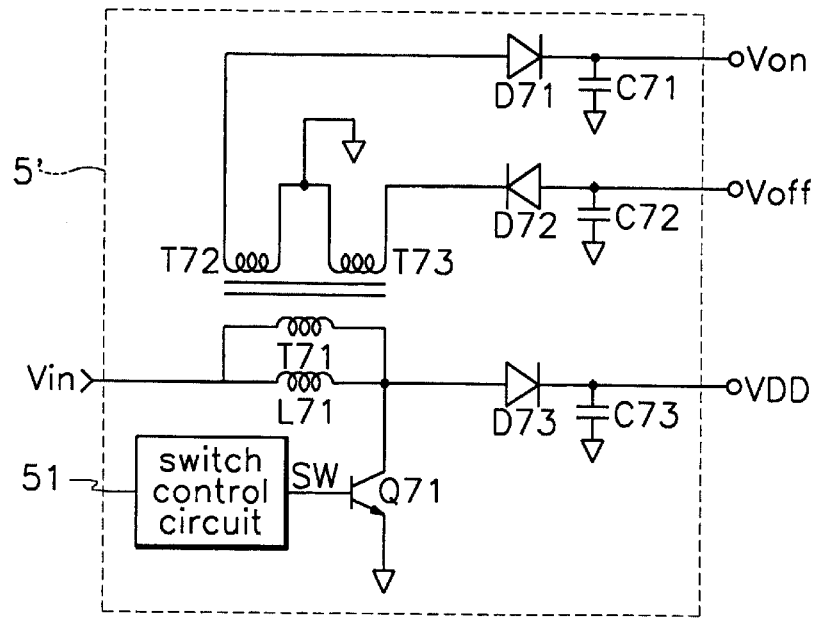
FIG. 7 is a detailed circuit diagram of a multiple output DC/DC voltage converter in accordance with a second embodiment of the present invention.

FIG. 7 is a detailed circuit diagram of a multiple output DC/DC voltage converter in accordance with a second embodiment of the present invention.

First, with reference to FIG. 5 and FIG. 6, the LCD in accordance with the first embodiment of the present invention is described.

As shown in FIG. 5, the LOD in accordance with the first embodiment of the present invention comprises an LCD panel 1, a gate driver 2, a source driver 3, a gray voltage generator 4 and a multiple output DC/DC voltage converter 5.

Figure 1:
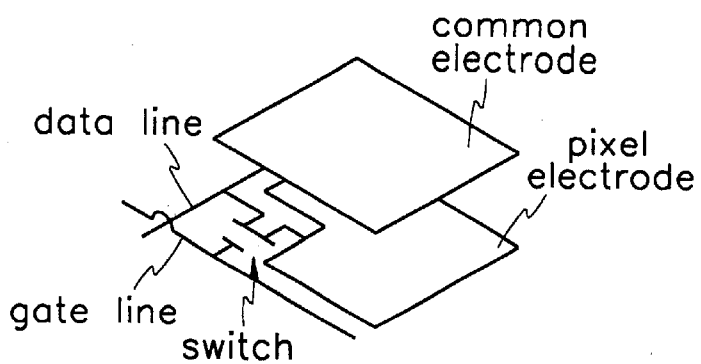
FIG. 1 roughly shows a structure of a pixel in an LCD.
Figure 2:
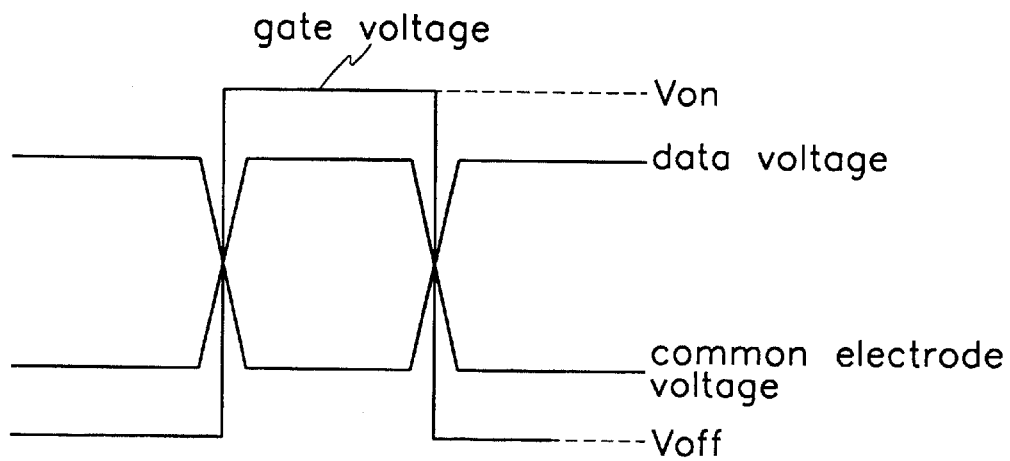
FIG. 2 shows waveforms of voltages applied to the pixel described in FIG. 1.
Figure 3:
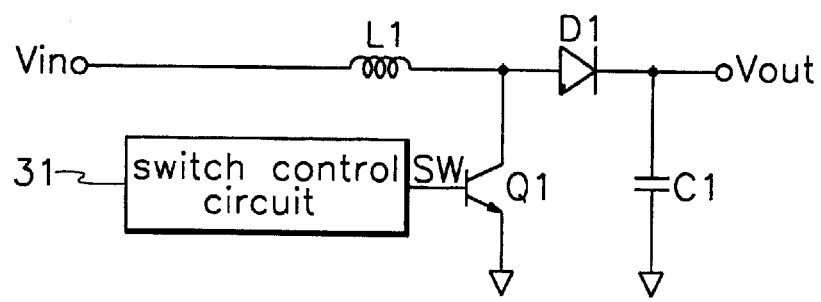
FIG. 3 shows a conventional voltage generator of a choke method using an inductor
Figure 4:
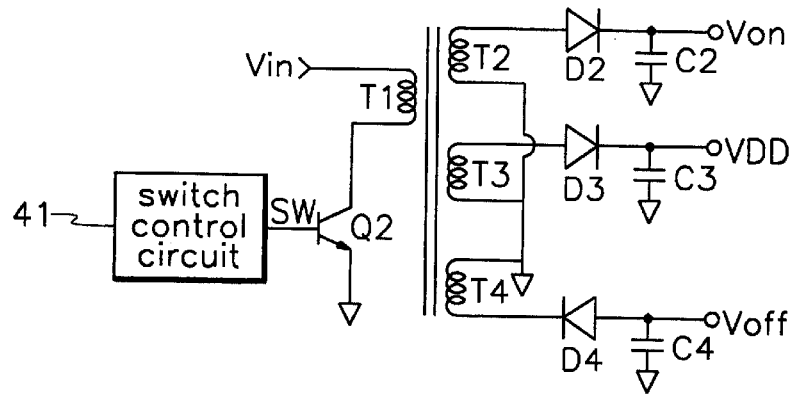
FIG. 4 shows a conventional voltage generator of a fly-back method using a transformer.

The LCD panel 1 has a plurality of pixels arranged in the matrix type and the each pixel has a structure described in FIG. 1. The gate driver 2 is connected to the LCD panel 1 via a plurality of the gate lines and scans the pixels of the LCD panel 1 by the row. The scanning is achieved by applying the gate on voltage Von to the each gate line sequentially. When the gate on voltage Von is applied to one of the gate lines, the gate off voltage Voff is applied to the rest of the gate lines. Herein, the gate on voltage Von and the gate off voltage Voff are provided from the multiple output DC/DC voltage converter 5.

The source driver 3 is connected to the LCD panel 1 via a plurality of the data lines, receives the video signal RGB and the gray voltage, selects the gray voltage corresponding to the video signal, and applies the selected gray voltage serving as the data voltage, to a plurality of the data lines of the LCD panel 1. The gray voltage generator 4 generates a plurality of the gray voltages using the data supply voltage VDD supplied from the multiple output DC/DC voltage converter 5 and provides a plurality of the gray voltages to the source driver 3. The multiple output DC/DC voltage converter generates the data supply voltage VDD, the gate on voltage Von and the gate off voltage Voff from the input voltage Vin and the switching signal SW.

FIG. 6 shows a first embodiment of the multiple output DC/DC voltage converter 5 in FIG. 5.

As shown in FIG. 6, the DC/DC voltage converter 5 includes a transformer having a primary coil T61 and two secondary coils T62, T63. The input voltage Vin is applied to one terminal of the primary coil T61 of the transformer and the other terminal of the primary coil T61 is connected the transistor Q61 turning on/off responsive to the switching signal SW from the switch control circuit 51. Anode of a diode D63 is connected between the transistor Q61 and the primary coil T61 of the transformer, a capacitor CB3 is connected between cathode of the diode D63 and the ground. A node voltage between the diode D63 and the capacitor C63 serves as the data supply voltage VDD.

A midpoint of the two secondary coils T62, T63 are grounded, the diode D61 and the capacitor C61 are coupled to the secondary coil T62, and the diode D62 and the capacitor C62 are coupled to the secondary coil T63. At this time, in order to pass minus current, the diode D62 is reverse-directional.

More specifcally, the transistor Q61 periodically turns on or off according to the switching signal SW. This switching operation causes the current flowing through the primary coil T61 of the transformer to change. Accordingly, the AC voltage is generated from the DC input voltage Vin. This AC voltage is rectified by the diode D63, charged in the capacitor C63, and accordingly the constant voltage is obtained thereby. At this time, the magnitude of the voltage charged in the capacitor C63 is determined by the on/off duty ratio of the transistor Q61.

Meanwhile, in the primary coil T61 of the transformer, it happens to change the current according to the switching operation of the transistor Q61, and consequently it happens to change magnetic flux. This change of the magnetic flux causes to flow currents through the secondary coils T62, T63 by electronic-magnetic induction. These currents are converted into the constant voltages by the diode-capacitor pairs connected to the each secondary coil T62, T63. That is, as illustrated above, the each current induced to the second winding T62 and T63 is rectified by the diode D61 and D62 and then charged in the capacitor C61 and C62, and therefore the constant voltages are obtained respectively. At this time, the magnitude and polarity of the voltage charged in the each capacitor C61, C62 are determined by the winding number and the winding direction of the secondary coils T62, T63. Among the above voltages, the constant voltage generated by electro-magnetic induction of the transformer has the low driving ability of current and power accuracy and therefore, in the first embodiment of the present invention, the voltages charged the capacitor C61, C62 are used as the gate on voltage and the gate off voltage. That is, since the gate on voltage Von and the gate off voltage Voff may be supplied by auxiliary supply voltages requiring the low power, the constant voltage with low efficiency is used. Further, the data supply voltage VDD requiring the high power utilizes the constant voltage directly generated from the primary coil T61 of the transformer without the electronic-magnetic induction.

As mentioned before, the first embodiment of the present invention provides a circuit which generates one main supply voltage VDD and two auxiliary supply voltages Von, Voff needed in driving the LCD, by combining the choke method with the high efficiency and the fly-back method having merits of providing the multiple output voltages and compactness. Herein, in the first embodiment of the present invention, the transformer has the two secondary coils, but if needed, the number of the secondary coil can be expanded.

FIG. 7 shows a second embodiment of the multiple output DC/DC voltage converter 5 in FIG. 5.

The second embodiment of the present invention has a feature that the size of the transformer in the multiple output DC/DC voltage converter is reduced.

More specifically, in the first embodiment, the main supply voltage generated from the primary coil T61 of the transformer provides high power and consequently a thick winding should be used. Accordingly, the size of the transformer becomes bigger. In the second embodiment, an inductor is parallelly connected to a primary coil of a transformer, and the inductor plays the same role as the primary coil in the first embodiment. That is, the inductor supplies a significant amount of the power, therefore, the primary coil can be thin and accordingly the size of the transformer can be reduced.

As shown in FIG. 7, the multiple output DC/DC voltage converter 5' in accordance with the second embodiment of the present invention includes an inductor L71 having one terminal applied with the DC input voltage Vin, and the other terminal connected to a transistor Q71 turning on/off responsive to the switching signal SW from the switch control circuit 51, and a transformer having a primary coil T71 connected to the inductor L71 in parallel and two secondary coils T72, T73. A diode D73 and a capacitor C73 are connected to the Jo inductor L71 in pair and the each pair of the diode-capacitor D71, C71: D72, C72 is connected to the secondary coils T72, T73 of the transformer, same as the multiple output DC/DC voltage converter in accordance with the first embodiment.

In the DC/DC voltage converter 5' in accordance with the second embodiment, the voltage charged in the capacitor C73 connected to the inductor L71 is provided as the main supply voltage, the data supply voltage VDD, the voltage charged in the capacitor C71 connected to the one secondary coil T72 of the transformer serves as the auxiliary supply voltage, the gate on voltage Von, and the voltage charged in the capacitor C72 connected to the other secondary coil T73 serves as the auxiliary supply voltage, the gate off voltage Voff.

Herein, the main supply voltage is obtained by the combined inductance made up of the inductor L71 and the primary coil T71 of the transformer and therefore the main supply voltage has high efficiency and high output. Further, the auxiliary supply voltage is produced from at least two more secondary coils and therefore the auxiliary supply voltage can supply the multiple output voltage. Herein, the primary coil T71 is connected to the inductor L71 in parallel and consequently, in order to get the inductance as same as that of the first embodiment, smaller winding can be used, and accordingly the size of the transformer can be reduced.

Except for the illustration above, the rest mechanism for generating voltages is equal to mechanism of the DC/DC voltage converter with the multiple output voltage 5' in accordance with the first embodiment referring to FIG. 6.

As illustrated above, the LCD in accordance with the present invention includes the multiple output DC/DC voltage converter producing the main supply voltage according to the choke method and the auxiliary supply voltages according to the fly-back method. Therefore, the LCD provides high efficient multiple output voltages needed in driving the LCD. Furthermore, since the multiple output DC/DC voltage converter in accordance with the present invention reduces the size of the transformer and consequently, it can be made more compact than the voltage converter adopting the conventional fly-back method. Therefore, it is preferred that the multiple output DC/DC voltage converter is used the portable electronic equipment like the LCD.

In this disclosure, there is shown and described only the preferred embodiments of the invention, but, as aforementioned, it is to be understood that the invention is capable of use in various other combinations and environments and is capable of changes or modification within the scope of the inventive concepts as expressed herein.

What is claimed is:

1. A liquid crystal display comprising:
   a liquid crystal display panel which has a plurality of pixels arranged in a matrix type in areas determined by a plurality of gate lines and a plurality of data lines crossing the gate lines;
   a gate driver which applies a gate on voltage to one of the gate lines sequentially thereby scanning the pixels in the liquid crystal display panel by a row;
   a source driver which receives a plurality of gray voltages and a video signal and selects the gray voltage corresponding to the video signal and applies the selected gray voltage to the data lines of the liquid crystal display panel;
   a gray voltage generator which generates a plurality of the gray voltages from data supply voltage and provides the gray voltages to the source driver; and
   a multiple output DC/DC converter which induces a transformer having a primary coil and at least one secondary coil that are coupled to one another by magnetic induction, receives a DC input voltage and generates main supply voltage from the primary coil of the transformer and at least two more auxiliary supply voltages from the at least one secondary coil of the transformer wherein, the main supply voltage is used as the data supply voltage and the auxiliary supply voltages are used as the gate on voltage and a gate off voltage.

2. The liquid crystal display according to claim 1, wherein the multiple output DC/DC voltage converter comprises:
   the transformer which includes a primary coil having one terminal applied with the DC input voltage and at least two more secondary coils;

a switch which is connected to the primary coil of the transformer, turns on/off responsive to a switching signal and consequently causes the current of the primary coil to change:

a plurality of diodes which are connected to the primary coil and the secondary coils respectively and rectify voltages generated in the each coil; and a plurality of capacitors which are connected to the each diode, are charged by the rectified voltage to generate constant voltages.

3. The liquid crystal display according to claim 2, wherein the constant voltage generated from the capacitor connected to the primary coil is output as the data supply voltage and the constant voltages generated from the each capacitor connected to at least two more the secondary coils are output as the gate on voltage and the gate off voltage.

4. The liquid crystal display according to claim 3, wherein the magnitude of the constant voltage generated from the capacitor connected to the primary coil is determined by on/off duty ratio of the switch and the magnitude of the constant voltages generated from the capacitors connected to the secondary coils are determined by the winding number of the secondary coils.

5. The liquid crystal display according to claim 2, wherein the multiple output DC/DC voltage converter further comprises a switch control circuit for generating the switch signal.

6. The liquid crystal display according to claim 1, wherein the multiple output DC/DC voltage converter comprises:

an inductor having one terminal applied with the DC input voltage;

a transformer which has a primary coil connected in parallel to the inductor and at least two more secondary coils;

a switch which is connected to the other terminal of the inductor, turns on/off responsive to a switch signal and consequentially causes the current of the primary coil to change;

a plurality of diodes which are connected to the inductor and the secondary coils, respectively and rectify voltages generated in the inductor and the secondary coils; and a plurality of capacitors which are connected to the each diode, are charged by the rectified voltages to generate constant voltages.

7. The liquid crystal display according to claim 6, wherein the constant voltage generated from the capacitor connected to the primary coil is output as the data supply voltage and the constant voltages generated from the each capacitor connected to at least two more the secondary coils are output as the gate on voltage and the gate off voltage.

8. The liquid crystal display according to claim 7, wherein the magnitude of the constant voltage generated from the capacitor connected to the primary coil is determined by on/off duty ratio of the switch and the magnitude of the constant voltages generated from the capacitors connected to the secondary coils are determined by the winding number of the secondary coils.

9. The liquid crystal display according to claim 6, wherein the multple output DC/DC voltage converter further comprises a switch control circuit for generating the switch signal.

10. A liquid crystal display comprising:

a liquid crystal display panel that includes a plurality of gate lines and a plurality of data lines;

a gate driver that drives the gate lines and is responsive to first and second gate voltages;

a source driver that drives the data lines and is responsive to a main supply voltage; and a multiple output DC/DC converter comprising a transformer including a primary coil and first and second secondary coils that are coupled to the primary coil by magnetic induction, wherein the main supply voltage is generated from the primary coil and the gate voltage is generated from the secondary coil, and wherein the second gate voltage is generated from the second secondary coil; and a switch that is connected to the primary coil and that controls current switching therein.

11. A liquid crystal display according to claim 10, further comprising a third rectifier that is connected to the second secondary coil to generate the second gate voltage therefrom.

12. A liquid crystal display according to claim 10 further comprising a first rectifier and a second rectifier, wherein the primary coil is connected between an input voltage and the switch, wherein the first rectifier is connected to the primary coil to generate the main supply voltage therefrom and wherein the second rectifier is connected to the secondary coil to generate the gate voltage therefrom.

13. A liquid crystal display according to claim 12 wherein the first rectifier comprises a first diode and a first capacitor and wherein the second rectifier comprises a second diode and a second capacitor.

14. A liquid crystal display according to claim 10 further comprising an inductor that is coupled across the primary coil, wherein the main supply voltage is generated from the primary coil and from the inductor.

* * * * *